United States Patent
Lagnado

(10) Patent No.: US 7,793,339 B2
(45) Date of Patent: *Sep. 7, 2010

(54) DEVICES AND METHODS OF USING NETWORK INFORMATION IN AN AUTHORIZATION PROCESS

(75) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

This patent is subject to a terminal disclaimer.

(21) Appl. No.: 11/237,355

(22) Filed: Sep. 28, 2005

(65) Prior Publication Data

US 2007/0079359 A1    Apr. 5, 2007

(51) Int. Cl.
    *G06F 7/04*    (2006.01)
(52) U.S. Cl. .................. 726/4; 726/18; 726/20
(58) Field of Classification Search .......... 726/4; 713/200; 395/200.59, 186, 187.01, 188.01; 380/3, 4, 23, 25, 30; 370/352
See application file for complete search history.

(56) References Cited

U.S. PATENT DOCUMENTS

| | | | |
|---|---|---|---|
| 6,314,520 B1 * | 11/2001 | Schell et al. | 726/13 |
| 6,484,262 B1 * | 11/2002 | Herzi | 726/34 |
| 6,961,762 B1 * | 11/2005 | Yeap et al. | 709/221 |
| 7,308,703 B2 * | 12/2007 | Wright et al. | 726/1 |
| 2002/0171546 A1 | 11/2002 | Evans et al. | |
| 2004/0123150 A1 | 6/2004 | Wright et al. | |
| 2005/0005150 A1 | 1/2005 | Ballard | |
| 2005/0047356 A1 * | 3/2005 | Fujii et al. | 370/311 |

FOREIGN PATENT DOCUMENTS

EP    1 508 848    2/2005

* cited by examiner

*Primary Examiner*—Pramila Parthasarathy

(57) ABSTRACT

A device comprises a network interface and a programmable processor to execute software that performs an authorization process that is a function of network information received by the network interface. The network information comprises information indicative of a network with which the network interface is able to communicate, and the software causes the device to perform a boot process such that if the authorization process is not successful, the device does not successfully complete the boot process.

19 Claims, 2 Drawing Sheets

DEVICES AND METHODS OF USING NETWORK INFORMATION IN AN AUTHORIZATION PROCESS

BACKGROUND

Portable computers are typically designed to be easily transported and used at many different locations. However, in some situations, a portable computer should only be used at particular locations and not used at other locations. In one example, sensitive or confidential data or applications are stored on a hard disk included in a portable computer. In such an example, such sensitive or confidential data or applications should only be used at particular locations and not used at other locations. Typically, a portable computer does not include any mechanism for limiting where the portable computer may be used. As result, a portable computer may be used in an inappropriate location.

DRAWINGS

Like reference numbers and designations in the various drawings indicate like elements.

DETAILED DESCRIPTION

Figure 1:
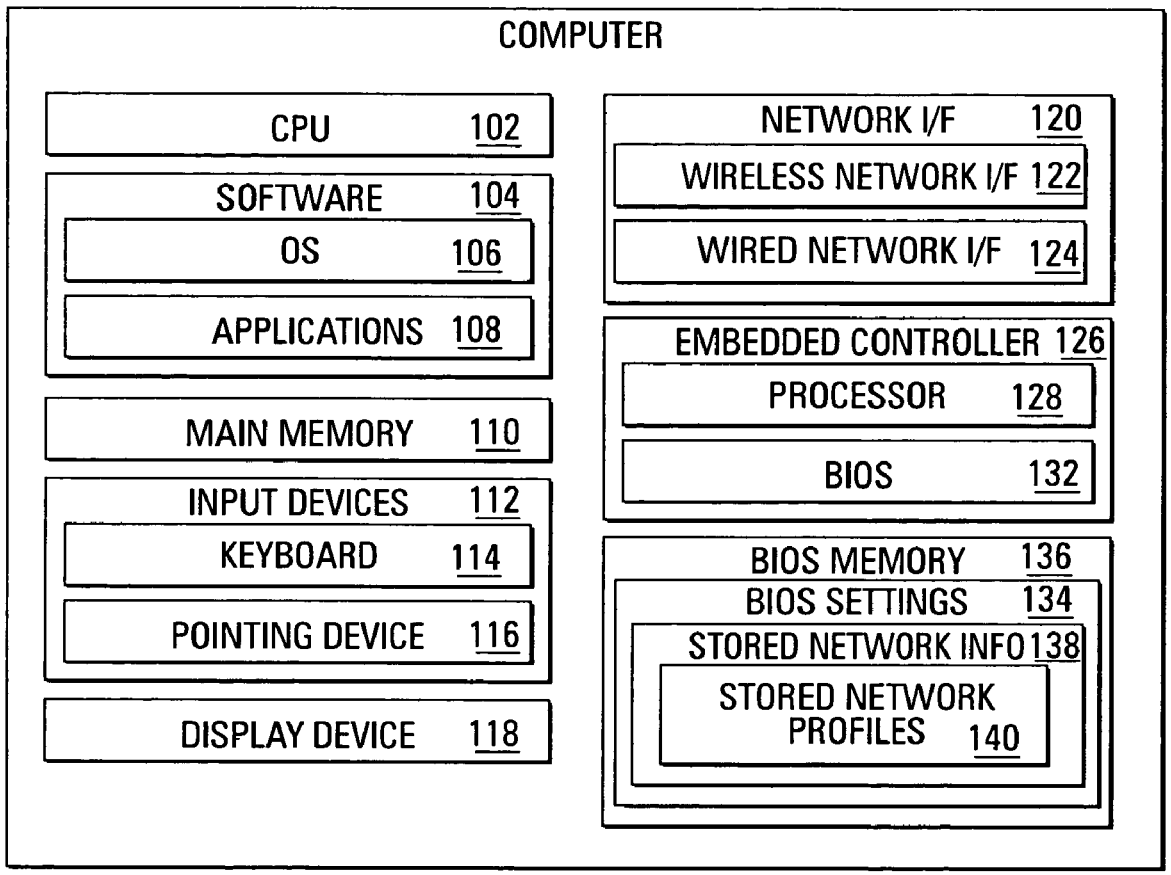
FIG. 1 is a high-level block diagram of one exemplary embodiment of a device in accordance with the invention.

FIG. 1 is a high-level block diagram of one exemplary embodiment of a device 100 in accordance with the invention. In the particular embodiment shown in FIG. 1, the device comprises a computer 100. In one implementation, the computer 100 comprises a portable computer. Other implementations and embodiments are implemented in other ways, for example, in or as a desktop computer, server computer, personal digital assistant, or other portable or non-portable electronic devices. Moreover, in other embodiments, the computer 100 is embedded in (or otherwise incorporated in or communicatively coupled to) other electrical systems or devices.

The computer 100 comprises at least one central processing unit (CPU) 102. The CPU 102 executes various items of software 104. In the embodiment shown in FIG. 1, the software 104 executed by the CPU 102 comprises an operating system (OS) 106 and one or more applications 108. The software 104 comprises program instructions that are embodied on one or more items of computer readable media (for example, a hard disk drive local to the computer 100 and/or shared media such as a file server that is accessed over a network such as a local area network). Typically, a portion of the software 104 executed by the CPU 102 and one or more data structures used by the software during execution are stored in a main memory 110. Main memory 110 comprises, in one embodiment, any suitable form of random access memory (RAM) now known or later developed, such as dynamic random access memory (DRAM).

One or more input devices 112 are communicatively coupled to the computer 100 by which a user is able to provide input to the computer 100. In the embodiment shown in FIG. 1, the input devices 112 comprise a keyboard 14 and a pointing device 16 (such as a mouse or a touch-pad). In one embodiment where the computer 100 comprises a portable computer, the keyboard 14 and the pointing device 16 are integrated into the portable computer. In such an embodiment, a keyboard and/or pointing device external to the portable computer can also be communicatively coupled to the computer 100 via one or more dedicated keyboard/pointing device interfaces (for example, a PS/2 interface) or one or more general input/output interfaces (for example, a universal serial port (USB) interface or BLUETOOTH interface). In some other embodiments, the computer 100 includes one or more interfaces by which external input devices are communicatively coupled to the computer 100.

One or more display devices 118 are communicatively coupled to the computer 100 on or by which the computer 100 is able to display output for a user. In one embodiment where the computer 100 comprises a portable computer, the display device 118 comprises a liquid crystal display that is integrated into the portable computer. In such an embodiment, the computer 100 also includes one or more interfaces by which one or more external display devices (for example, one or more external computer monitors) can be communicatively coupled the computer 100. In some other embodiments, the computer 100 does not include an integrated display device 118 and includes one or more interfaces by which one or more external display devices are communicatively coupled to the computer 100.

The computer 100 also includes one or more network interfaces 120 for communicatively coupling the computer 100 (and the components thereof) to one or more networks. In the particular embodiment shown in FIG. 1, the computer 100 comprises a wireless network interface 122 and a wired network interface 124. The wireless network interface 122 is used to communicatively couple the computer 100 to, and send and receive data to and from, a network or other device using a wireless communication link (for example, a radio frequency or infra-red wireless communication link). In one implementation of such an embodiment, the wireless network interface 122 supports one or more of the Institute for Electrical and Electronics Engineers (IEEE) 802.11 family of standards. The wired network interface 124 is used to communicatively couple the computer 100 to, and send and receive data to and from, a network or other device using a wired communication link (for example, a copper-twisted pair cable or a fiber-optic cable). In one implementation of such an embodiment, the wired network interface 124 supports one or more of the IEEE 802.3 family of standards (also referred to here as the "ETHERNET" networking protocol).

In one implementation of the computer 100 shown in FIG. 1, one or more of the network interfaces 120 are removable by a user of the computer 100. In such an implementation, the computer 100 includes one or more slots into which such removable network interfaces are inserted (for example, a general-purpose slot such as PC-CARD slot and/or a specially adapted slot such as a slot specially adapted to receive a network interface implemented as a MINI-PCI card).

In the embodiment shown in FIG. 1, the computer 100 also comprises an embedded controller 126 that controls the operation of one or more of the other components in the computer 100. For example, in one implementation of such an embodiment, the embedded controller 126 implements functionality that enables the computer 100 to support the Advanced Configuration and Power Interface (ACPI) specification. In such an implementation, the embedded controller 126 interacts with configuration and/or power management interfaces provided by various components in the computer 100.

In the embodiment shown in FIG. 1, the embedded controller 126 is implemented using a programmable processor 128 that executes appropriate software to carry out the processing described here as being performed by the embedded controller 126. Such software comprises program instructions that are stored (or otherwise embodied) on an appropriate storage medium or media (such as flash memory) from which at least a portion of the program instructions are read by the programmable processor 128 for execution thereby. In the embodiment shown in FIG. 1, the software executed by the programmable processor 128 of the embedded controller 126 comprises a basic input/output system (BIOS) 132 that provides an interface between the hardware of the computer 100 and the operating system 106 and other software 104 executed by the CPU 102. Various system configuration settings 134 (also referred to here as a "BIOS settings" 134) that are used by the BIOS 132 are stored in memory 136 (also referred to here as "BIOS memory" 136). In the particular embodiment shown in FIG. 1, the BIOS memory 136 comprises non-volatile memory (for example, complimentary metal oxide (CMOS) memory). In other embodiments, the memory 136 in which the BIOS settings 134 are stored is located elsewhere in the computer 100 and/or is implemented using other types of memory now known or later developed (for example, others types of non-volatile memory).

In the embodiment shown in FIG. 1, the BIOS 132 performs an authorization process in order to determine if the computer 100 is currently located in a location in which it is appropriate for the computer 100 to be used. Such a location is also referred to here as an "authorized location." The authorization process is a function of network information received by at least one of the network interfaces 120. Such network information is indicative of any networks (or network elements included in such networks) with which such a network interface 120 is able to communicate. In the embodiment shown in FIG. 1, when the computer 100 is physically located in an authorized location, there is a network to which the computer 100 can be communicatively coupled via at least one of the network interfaces 120. The network interface 120 receives (or otherwise generates or obtains) information that can be used to identify the network while the computer 100 is located in the location associated with that network.

Figure 2:
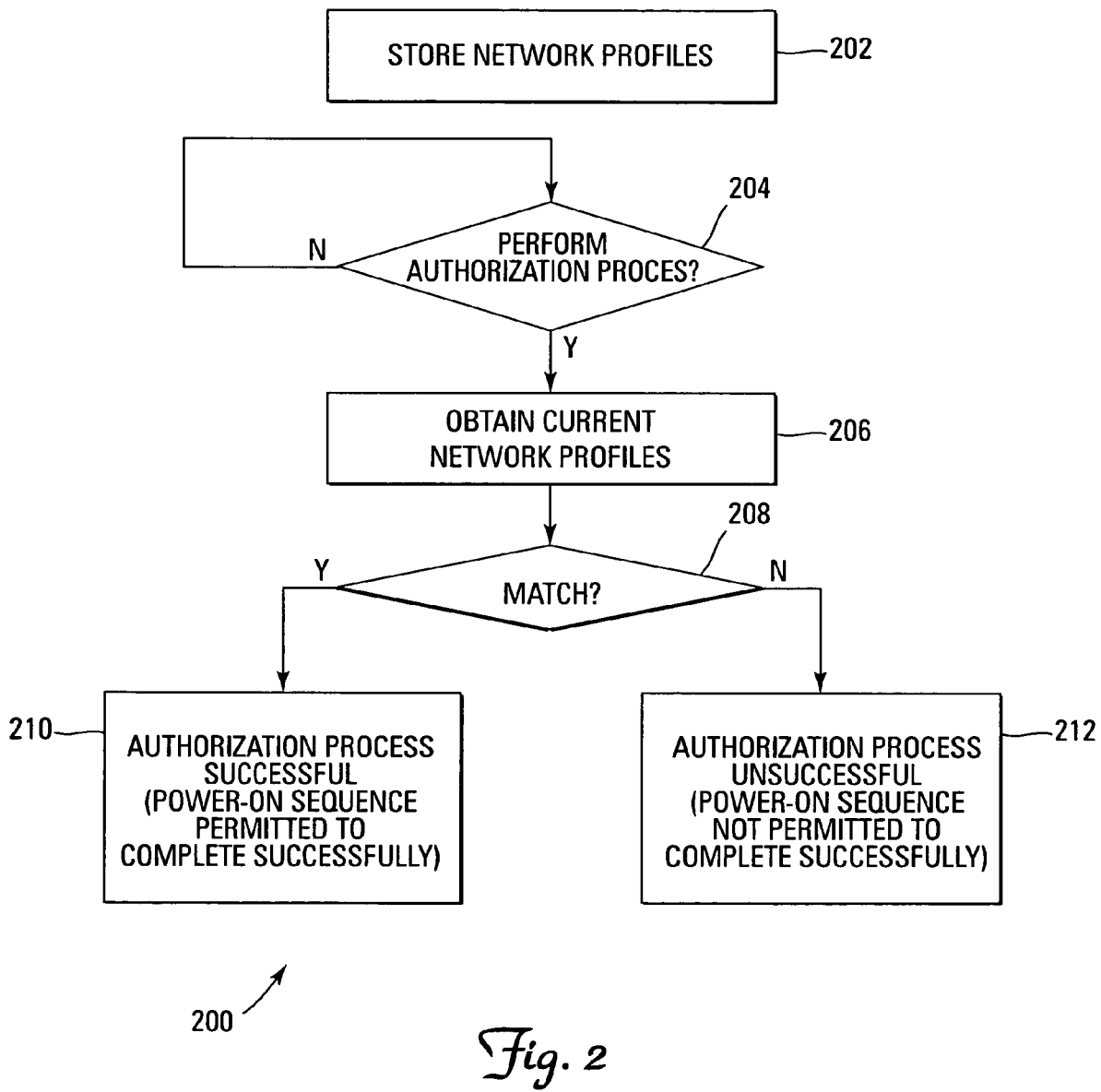
FIG. 2 is a flow diagram of one exemplary embodiment of a method of determining if a computer is located in an authorized location in accordance with the invention.

In the embodiment shown in FIG. 1, network information 138 is stored in the memory 136. Such information is also referred to here as a "stored network information" 138. The stored network information 138 comprises information that identifies one or more networks that are associated with a respective authorized location. In the embodiment shown in FIG. 1, the stored network information 138 comprises a set of network profiles 140 (also referred to here as "stored network profiles" 140), where each stored network profile 140 contains one or more items of information that identifies a respective network. In one exemplary implementation, for a wireless network that is associated with an authorized location, a respective stored network profile 140 comprises one or more of the following items of information: a service set identifier (SSID) or a media access control (MAC) address of a wireless access point included in the wireless access network and security features supported by the wireless network (for example, information about any encryption used in the wireless network). For a wireless network that is associated with an authorized location, a respective stored network profile 140 comprises one or more of the following items of information: dynamic name service (DNS) information, gateway information, dynamic host configuration protocol (DHCP) information, and authentication information. The network information 138, in the embodiment shown in FIG. 1, is used by the BIOS 132 in the authorization process to determine if the computer 100 is currently located in an authorized location FIG. 2 is a flow diagram of one embodiment of a method 200 of determining if a computer is located in an authorized location. The embodiment of method 200 shown in FIG. 2 is described here as being implemented using the computer 100 of FIG. 1, though other embodiments are implemented in other ways. In particular, at least a portion of the functionality of method 200 is performed by the BIOS 132 of the computer 100. The BIOS 132, in one implementation of such an embodiment, includes a user-selectable option by which a user of the computer 100 is able to enable or disable the functionality of method 200. In such an implementation, access to the user-selectable option is secured (for example, by requiring a user to enter an appropriate password to access such BIOS functionality).

Method 200 comprises storing, in the memory 136 of the computer 100, network information 138 that identifies (or is otherwise indicative of) one or more networks associated with one or more respective authorized locations (block 202). In an embodiment of method 200 implemented using the computer 100 of FIG. 1, the network information 138 is arranged into a set of network profiles 140, where each network profile 140 identifies a respective network associated with a respective authorized location. In one embodiment, the BIOS 132 includes functionality for receiving one or more network profiles 140. Such functionality is secured (for example, by requiring a user to enter an appropriate password to access such BIOS functionality). In one implementation of such an embodiment, the BIOS 132 includes functionality that prompts (for example, by displaying an appropriate user interface element on the display device 118) a user to enter (via an input device 112) one or more network profiles, each of which identifies a respective network that is associated with a respective authorized location. The BIOS 132 stores the entered network profiles in the memory 136 as a part of the network information 138. In another implementation, the BIOS 132 includes functionality that enables a user, when the computer 100 is communicatively coupled to a network via one of the network interfaces 120, to save, in the memory 136 as a part of the network information 138, a network profile that is based on the network information received (or otherwise generated or obtained) by that network interface 120. In this way, a user need not manually enter such network information 138. In another implementation, the BIOS 132 includes functionality that enables a user, when the computer 100 is communicatively coupled to a network via one of the network interfaces 120, to save, in the memory 136 as a part of the network information 138, network credentials (for example, a certificate, username/password pair, or token) that are used to authenticate the computer 100 onto the network.

Method 200 further comprises, when the computer 100 performs an authorization process (checked in block 204), obtaining information about any networks with which a network interface 120 included in the computer 100 is able to communicate (block 206). Such information is also referred to here as "current network information." In an embodiment of method 200 implemented using the computer 100 of FIG. 1, the current network information is arranged as a set of network profiles (also referred to here as a "current network profiles"), where each current network profile identifies (or is otherwise indicative of) a respective network with which a network interface 120 is able to communicate.

If at least one of the current network profiles matches at least one network profile 140 stored in the memory 136 of the computer 100 (checked in block 208), the authorization process is successful (block 210). If at least one of the current network profiles does not match at least one network profile 140 stored in the memory 136 of the computer 100, the authorization process is not successful (block 212). In an embodiment of method 200 implemented using the computer 100 of FIG. 1, a current network profile "matches" a stored network profile 140 if each element of the stored network profile 140 matches a corresponding element included in the current network profile. If a current network profile matches a stored network profile 140, the BIOS 132 assumes that the computer 100 is located within the authorized location associated with that stored network profile. In the particular embodiment shown in FIG. 1, if such an authorization process is unsuccessful, a power-on sequence of the computer 100 is not permitted to complete successfully in order to prohibit or otherwise deny access to the computer 100 (for example, by not permitting the computer 100 to enter an operational state in which a user is able to interact with the computer 100). If such an authorization process is successful, a power-on sequence of the computer 100 is permitted to complete successfully. In other embodiments, the results of the authorization process are used in other ways. Also, as used herein, the current network information is considered "validated" if the current network information matches the stored network information.

In one embodiment, the computer 100 performs such an authorization process during a boot process performed when the computer 100 is initially powered on (that is, when the computer enters an operational state from a fully powered-off state), during a "wake-up" process performed when the computer 100 enters a fully operational state from a sleep state (for example, a standby or hibernation state), or during another power-on sequence. In one implementation of such an embodiment, the BIOS 132 manages such a boot or wake-up process. When the computer 100 is in a fully powered-off state or sleep state, the BIOS 132 computer 100 starts the boot process or wake-up process, for example, in response to a user actuating an "ON" button included in the computer 100.

In one implementation, when such an ON button is actuated, the BIOS 132 causes the wireless network interface 122 to scan for any wireless networks with which that wireless network interface 122 is able to communicate. As a result, the wireless network interface 122 will receive (or otherwise generate or obtain) information about any wireless networks that are detected by the scan. Such information includes, for example, a SSID and/or MAC address of a wireless access point included in a wireless network and any security features (such as encryption) supported by the wireless network. In one such implementation, the wireless network interface 122 performs a passive scan in which the wireless network interface 122 does not broadcast, during the passive scan, any information about the computer 100 or the wireless network adapter 122. The received network information, in such an implementation, is used to define a current network profile associated with each such wireless network the wireless network interface 122 is able to communicate with. If at least one of the current network profiles does not match at least one network profile 140 stored in the memory 136 of the computer 100, the boot process or wake-up process is not permitted to successfully complete and a message is displayed on the display device 118 indicating why the boot process or wake-up process did not successfully complete. If at least one of the current network profiles matches at least one network profile 140 stored in the memory 136 of the computer 100, the boot process or wake-up process is permitted to successfully complete.

In another implementation, when such an ON button is actuated, the BIOS 132 automatically causes the wired network interface 124 to listen for any network traffic that identifies the network (or a network device included in the network) to which the wired network interface 124 is communicatively coupled (for example, by listening for DNS information, gateway information, or DHCP information). The received network information, in such an implementation, is used to define a current network profile associated with each such wired network the wired network interface 124 is able to communicate with. If at least one of the current network profiles does not match at least one network profile 140 stored in the memory 136 of the computer 100, the boot process or wake-up process is not permitted to successfully complete and a message is displayed on the display device 118 indicating why the boot process or wake-up process did not successfully complete. If at least one of the current network profiles matches at least one network profile 140 stored in the memory 136 of the computer 100, the boot process or wake-up process is permitted to successfully complete.

In another implementation, when such an ON button is actuated, the BIOS 132 causes the wired network interface 124 or wireless network interface 122 to attempt to authenticate the computer 100 with a secured network using credentials stored in BIOS memory 136 via an authentication protocol (for example, the Extensible Authentication Protocol (EAP) or the Protected Extensible Authentication Protocol (PEAP)). If authentication with the secured network is completed successfully using the stored network credentials, then the BIOS 132 assumes that the computer 100 is located within the authorized location associated with that stored network profile. In one such implementation, if authentication with the secured network using the network credentials stored in memory 136 is unsuccessful, a message is displayed on the display device 118 indicating why such a boot or wake-up process was unsuccessful.

In this way, the BIOS 132 of the computer 100 performs an authorization process that uses network information to determine if the computer 100 is being used in a location in which it is appropriate for the computer 100 to be used. Such functionality can be used with computers on which secure applications and/or data that should only be used in certain authorized locations are stored. Such functionality can also be used, for example, as a theft deterrent. In other embodiments, such functionality is used in other applications.

Moreover, in the event that one of the network interfaces 120 is removed from the computer 100 (for example, wherein the network interface 120 is user removable), the BIOS 132 is unable to receive current network information from the removed network interface 120. To the extent that the removed network interface 120 is necessary for the computer 100 to receive current network information about a network associated with a particular network profile 140 stored in the memory 136, there will be no "match" with that network profile 140.

Although the processing of method 200 is described here as being implemented using the BIOS 132 of the computer 100, in other embodiments such processing is implemented in other ways. For example, in one such alternative embodiment, at least a portion of the processing of method 200 is performed by software executed by a central processing unit (for example, as a part of an operating system). In such an alternative embodiment, the operating system includes functionality for storing network information that identifies one or more networks that are associated with a respective authorized location (for example, functionality that is accessible by a "root" or "administrator" user of the computer). Such network information, one implementation, is stored on a hard drive included in the computer. When the operating system is in the process of entering an operational state (for example, whenever a user "logs" into the computer), the operating system determines if any current network information received by one or more of the network interfaces included in the computer matches any of the stored network profiles. If such a match occurs, the operating system allows the computer to enter the operational state. Otherwise, the operating system does not allow the computer to enter the operational state.

Furthermore, although the processing of method 200 is described here as being used to determine if a location at which the computer 100 is being used is an authorized location, it is to be understood that such techniques can be used in other applications.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory previously or now known or later developed, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and DVD disks. Any of the foregoing may be supplemented by, or incorporated in, specially-designed application-specific integrated circuits (ASICs).

What is claimed is:

1. A device comprising:
a network interface; and
a programmable processor to execute software that performs an authorization process that is a function of network information received by the network interface;
wherein the network information comprises information identifies a network with which the network interface is able to communicate, and the software causes the device to perform a boot process such that if the authorization process is not successful, the device does not successfully complete the boot process; and
wherein, for the authorization process, the processor compares network profiles stored in the device to the network information received by the network interface, wherein the stored network profiles identifies those networks associated with one or more respective authorized locations.

2. The device of claim 1, wherein access to the device is prohibited if the authorization process is not successful.

3. The device of claim 1, wherein the software causes the device to perform a wake-up process, wherein the wake-up process causes the device to exit a sleep state, wherein if the authorization process is not successful, the device does not successfully complete the wakeup process.

4. The device of claim 1, wherein the network interface comprises at least one of a wireless network interface and a wired network interface.

5. The device of claim 1, wherein the authorization process is not successful if the network information received by the network interface does not match at least a portion of network information stored by the device.

6. The device of claim 5, wherein the network information stored by the device comprises information associated with at least one location.

7. The device of claim 5, wherein the network interface information stored by the device comprises at least one stored network profile and the network information received by the network interface comprises at least one current network profile.

8. A portable computer comprising:
a network interface;
wherein an authorization process is performed for the portable computer that is a function of network information received by the network interface;
wherein the network information identifies a network with which the network interface is able to communicate; and
wherein failure of the authorization process precludes the portable computer from completing a boot process;
wherein, for the authorization process, the portable computer compares network profiles stored in the portable computer to the network information received by the network interface, wherein the stored network profiles identifies those networks associated with one or more respective authorized locations.

9. The portable computer of claim 8, wherein the portable computer performs the authorization process.

10. The portable computer of claim 8, further comprising a programmable processor to execute software that performs the authorization process.

11. The portable computer of claim 8, wherein the network interface comprises at least one of a wireless network interface and a wired network interface.

12. A computer comprising:
a network interface;
a programmable processor to execute software that performs an authorization process that uses network information received by the network interface, said network information identifies a network over which the computer communicates;
wherein the software comprises an input/output system that performs a boot process such that if the authorization process is not successful, the input/output system does not successfully complete the boot process;
wherein the network information comprises at least one of: dynamic name service information, gateway information, dynamic host configuration protocol information, and network authentication information.

13. The computer of claim 12, wherein if the input/output system does not successfully complete the boot process, then access to the computer is denied.

14. The computer of claim 12, wherein the input/output system performs a wake-up process that causes the computer to exit a sleep state, wherein if the authorization process is not successful, the input/output system does not successfully complete the wake-up process.

15. A method comprising:
receiving network information from a network interface included in a computing device, wherein the network information is indicative of a network with which the network interface is able to communicate;

performing an authorization process using the network information received by the network interface included in the computing device; and denying access to the computing device unless the authorization process validates the network information;

wherein the network information comprises at least one of: dynamic name service information, gateway information, dynamic host configuration protocol information, and network authentication information.

16. The method of claim 15, wherein the information indicative of the network comprises information indicative of a network element included in the network.

17. The method of claim 15, wherein the network information comprises at least one of:

a service set identifier (SSID) of a network element included in a wireless network, a media access control (MAC) address of the network element included in the wireless access network, and security features supported by the wireless network.

18. The method of claim 15, wherein denying access further comprises prohibiting the computing device from completing a boot process to power-on the computing device.

19. A processor-readable storage medium comprising program instructions, wherein the program instructions are operable to cause a programmable processor included in a device to:

receive network information from a network interface included in the device, wherein the network information identifies a network with which the network interface is able to communicate;

perform an authorization process using the network information received by the network interface included in the device, wherein the authorization process comprises a comparison of network profiles stored in the device to the network information received by the network interface, wherein the stored network profiles identifies those networks associated with one or more respective authorized locations; and prohibit the device from completing a power-up sequence unless the authorization process validates the network information received from the device.

* * * * *

UNITED STATES PATENT AND TRADEMARK OFFICE
CERTIFICATE OF CORRECTION

| | | |
|---|---|---|
| PATENT NO. | : 7,793,339 B2 | Page 1 of 1 |
| APPLICATION NO. | : 11/237355 | |
| DATED | : September 7, 2010 | |
| INVENTOR(S) | : Isaac Lagnado | |

It is certified that error appears in the above-identified patent and that said Letters Patent is hereby corrected as shown below:

In column 1, line 63, delete "14" and insert -- 114 --, therefor.

In column 1, line 64, delete "16" and insert -- 116 --, therefor.

In column 1, line 66, delete "14" and insert -- 114 --, therefor.

In column 1, line 66, delete "16" and insert -- 116 --, therefor.

Signed and Sealed this
Eighth Day of March, 2011

David J. Kappos
*Director of the United States Patent and Trademark Office*